US011114713B2

(12) United States Patent
Sunada et al.

(10) Patent No.: US 11,114,713 B2
(45) Date of Patent: Sep. 7, 2021

(54) THERMAL MANAGEMENT SYSTEMS FOR BATTERY CELLS AND METHODS OF THEIR MANUFACTURE

(71) Applicant: California Institute of Technology, Pasadena, CA (US)

(72) Inventors: Eric T. Sunada, Alhambra, CA (US); Scott N. Roberts, Altadena, CA (US); Benjamin I. Furst, Pasadena, CA (US); Ratnakumar V. Bugga, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 108 days.

(21) Appl. No.: 16/447,824

(22) Filed: Jun. 20, 2019

(65) Prior Publication Data
US 2019/0393576 A1    Dec. 26, 2019

Related U.S. Application Data

(60) Provisional application No. 62/688,216, filed on Jun. 21, 2018.

(51) Int. Cl.
*H01M 10/613*    (2014.01)
*H01M 10/653*    (2014.01)
(Continued)

(52) U.S. Cl.
CPC ..... *H01M 10/6569* (2015.04); *H01M 10/613* (2015.04); *H01M 10/653* (2015.04);
(Continued)

(58) Field of Classification Search
CPC .. H01M 10/04; H01M 10/613; H01M 10/653; H01M 10/6552; H01M 10/6554;
(Continued)

(56) References Cited

U.S. PATENT DOCUMENTS 4,602,679 A    7/1986  Edelstein et al.
RE35,721 E    2/1998  Daikoku et al.
(Continued)

OTHER PUBLICATIONS

Kozuki et al., "Skeletal structure with artificial perspiration for cooling by latent heat for musculoskeletal humanoid kengoro", IEEE/RSJ International Conference on Intelligent Robots and Systems (IROS), Oct. 9-14, 2016, doi: 10.1109/IROS.2016.7759335.
(Continued)

*Primary Examiner* — Imran Akram
(74) *Attorney, Agent, or Firm* — KPPB LLP

(57) ABSTRACT

Thermal management systems for battery cells and methods for their additive manufacture are provided. The thermal management systems include at least one heat pipe that physically contacts the battery cell and conforms to its geometry. Each battery cell is deposited within a separate heat pipe, and each heat pipe is disposed on a base plate, which itself connects to a heat sink. In many embodiments, the heat pipe is a two-phase heat exchanger having three major components: liquid channels, wick elements, and vapor channels. In such embodiments, the wick component comprises a porous body configured to be disposed between the liquid channels and vapor channels. The wick component may be made using a stochastic additive manufacturing process such that the wick component may take any configuration and/or such that the wick component may be directly integrated into the body of the heat pipe as a unitary piece thereof. In other embodiments, the heat pipe is a cavity with flow channels in which fluid can be pumped through. In some such embodiments, the fluid can occupy the heat pipe in a one-phase or two-phase state. This unitary heat pipe is part of a monolithic thermal management system.

20 Claims, 10 Drawing Sheets

700

(51) Int. Cl.
*H01M 10/6567* (2014.01)
*H01M 10/658* (2014.01)
*H01M 10/6552* (2014.01)
*H01M 10/6569* (2014.01)

(52) U.S. Cl.
CPC ..... *H01M 10/658* (2015.04); *H01M 10/6552* (2015.04); *H01M 10/6567* (2015.04)

(58) Field of Classification Search
CPC ......... H01M 10/6557; H01M 10/6567; H01M 10/6569; H01M 10/658
See application file for complete search history.

(56) References Cited

U.S. PATENT DOCUMENTS

| | | | |
|---|---|---|---|
| 5,725,049 | A | 3/1998 | Swanson et al. |
| 6,330,907 | B1 | 12/2001 | Ogushi et al. |
| 6,382,309 | B1 | 5/2002 | Kroliczek et al. |
| 9,179,575 | B1 | 11/2015 | Yao |
| 10,746,475 | B2 | 8/2020 | Roberts et al. |
| 2009/0059528 | A1* | 3/2009 | Damsohn .......... H01M 10/6557 361/701 |
| 2010/0209759 | A1* | 8/2010 | Rejman ............. H01M 10/6235 429/156 |
| 2011/0287285 | A1* | 11/2011 | Yoon ....................... B60L 58/27 429/9 |
| 2012/0137718 | A1 | 6/2012 | Uchida et al. |
| 2012/0148889 | A1* | 6/2012 | Fuhr ................. H01M 10/6567 429/87 |
| 2013/0223010 | A1 | 8/2013 | Shioga et al. |
| 2013/0312939 | A1 | 11/2013 | Uchida et al. |
| 2014/0045024 | A1* | 2/2014 | Waters ............. H01M 10/0525 429/99 |
| 2014/0318167 | A1 | 10/2014 | Uchida |
| 2017/0028869 | A1* | 2/2017 | Boddakayala ...... H01M 10/613 |
| 2017/0047624 | A1* | 2/2017 | Gunna ................ H01M 10/625 |
| 2017/0346144 | A1* | 11/2017 | Addanki .......... H01M 10/6551 |
| 2018/0031330 | A1 | 2/2018 | Roberts et al. |
| 2018/0062228 | A1* | 3/2018 | Wuensche ............. H01M 50/20 |
| 2018/0254536 | A1* | 9/2018 | Chidester .......... H01M 10/6556 |
| 2019/0140228 | A1* | 5/2019 | Handley ............... H01M 50/20 |
| 2020/0378687 | A1 | 12/2020 | Roberts et al. |

OTHER PUBLICATIONS

Pumped Two Phase Cooling, Advanced Cooling Technologies, Retrieved from https://www.1-act.com/innovations/pumped-two-phase-cooling/.
"The next generation large additive machine", GE Additive, Nov. 15, 2017, Retrieved from the Internet https://www.ge.com/additive/additive-manufacturing/machines/project-atlas, 7 pgs.
"Two-Phase Evaporative Precision Cooling Systems for heat loads from 3 to 300kW", Parker Hannifin Corporation, 2011, 8 pgs.
Ambrose et al., "A pumped heat pipe cold plate for high-flux applications", Experimental thermal and fluid science, 1995, Received Aug. 30, 1993, vol. 10, pp. 156-162.
Ameli et al., "A novel method for manufacturing sintered aluminum heat pipes (SAHP)", Applied Thermal Engineering, Jan. 5, 2013, vol. 52, pp. 498-504.
Ameli, "Additive Layer Manufactured Sinter-Style Aluminum/Ammonia Heat Pipes", Sep. 2013 Thesis, Faculty of Engineering and Environment, Research undertaken in the Faculty of Engineering and Environment in collaboration with Thermacore Europe, 182 pages.
Bland et al., "A two-phase thermal management system for large space platforms", AIAA 19th Thermophysics Conference, Jun. 25-28, 1984, AIA-841758, 10 pgs.
Choi et al., "Experimental investigation on sintered porous wicks for miniature loop heat pipe applications", Experimental Thermal and Fluid Science, Aug. 11, 2013, vol. 51, pp. 271-278.

Coso et al., "Enhanced Heat Transfer in Biporous Wicks in the Thin Liquid Film Evaporation and Boiling Regimes", Journal of Heat Transfer, Oct. 2012, vol. 134, 11 pgs.
Crepinsek et al., "Effect of operational conditions on cooling performance of pump-assisted and capillary-driven two-phase loop", Journal of Thermophysics and Heat Transfer, Oct.-Dec. 2011, vol. 25, No. 4, pp. 572-580.
Delil et al., "Development of a Mechanically Pumped Two-Phase CO2 Cooling Loop for the AMS-2 Tracker Experiment", National Aerospace Laboratory NLR, SAE Technical Paper, No. 2002-01-2465, Jul. 14-18, 2002, 11 pgs.
Drolen et al., "Lithium Ion Battery Thermal Propagation Modeling: Considerations and Lessons Learned", 2017, Retrieved from the Internet https://nescacademy.nasa.gov/video/f9c8eb57f8114f47b279877b703214cc1d.
Frazier et al., "Metal additive manufacturing: a review", Journal of Materials Engineering and Performance, Jun. 2014, vol. 23, No. 6, pp. 1917-1928, doi: 10.1007/s11665-014-0958-z.
Friedel, "Improved friction pressure drop correlations for horizontal and vertical two phase pipe flow", 3R International, Jul. 1979, vol. 18, No. 7, 7 pgs.
Furst et al., "A Comparison of System Architectures for a Mechanically Pumped Two-Phase Thermal Control System", 47th International Conference on Environmental Systems, Jul. 16-20, 2017, ICES-2017-119, 20 pgs.
Gou et al., "Feasibility study on a novel 3D vapor chamber used for Li-ion battery thermal management system of electric vehicle", Applied Thermal Engineering, Feb. 9, 2019, doi: https://doi.org/10.1016/j.applthermaleng.2019.02.034.
Holley et al., "Permeability and effective pore radius measurements for heat pipe and fuel cell applications", Applied thermal engineering, 2006, Accepted May 22, 2005, vol. 26, pp. 448-462.
Jiang et al., "Experimental investigation of pump-assisted capillary phase change loop", Applied Thermal Engineering, Jul. 19, 2014, vol. 71, pp. 581-588.
Kim et al., "Review on Battery Thermal Management System for Electric Vehicles", Applied Thermal Engineering, Dec. 3, 2018, 10.1016/j.applthermaleng.2018.12.020.
Konishi et al., "Review of flow boiling and critical heat flux in microgravity", International Journal of Heat and Mass Transfer, 2015, Available online Oct. 11, 2014, vol. 80, pp. 469-493.
Krishna et al., "Low stiffness porous Ti structures for load-bearing implants", Acta Biomaterialia, May 25, 2007, vol. 3, pp. 997-1006.
Ku, "Operating characteristics of loop heat pipes", 29th International Conference on Environmental System, Jul. 12-15, 1999, 1999-01-2007, 16 pgs.
Ku et al., "The Hybrid Capillary Pumped Loop", SAE Technical Paper, No. 881083, 1988, 11 pgs.
Lemmon et al., "NIST reference fluid thermodynamic and transport properties—REFPROP", NIST standard reference database 23, Version 7.0, Aug. 2002, 162 pgs.
Liu et al., "Experimental Investigation of New Flat-Plate-Type Capillary Pumped Loop", Journal of Thermophysics and Heat Transfer, Jan.-Mar. 2008, vol. 22, No. 1, pp. 98-104.
Lockhart et al., "Proposed correlation of data for isothermal two-phase, two-component flow in pipes", Chemical Engineering Progress, 1949, vol. 45, No. 1, pp. 39-48.
Marchitto et al., "Experiments on two-phase flow distribution inside parallel channels of compact heat exchangers", International Journal of Multiphase Flow, 2008, Received Feb. 14, 2007, vol. 34, pp. 128-144.
Nguyen et al., "Study on heat transfer performance for loop heat pipe with circular flat evaporator", International Journal of Heat and Mass Transfer, 2012, Received Dec. 26, 2010, vol. 55, pp. 1304-1315.
Parhizi et al., "Analytical Modeling and Optimization of Phase Change Thermal Management of a Li-ion Battery Pack", Applied Thermal Engineering, Nov. 5, 2018, doi: 10.1016/j.applthermaleng.2018.11.017.
Park et al., "Performance Evaluation of a Pump-Assisted, Capillary Two-Phase Cooling Loop", Journal of Thermal Science and Engineering Applications, Jun. 2009, vol. 1, 022004, 8 pgs, doi: 10.1115/1.4000405.

(56) References Cited

OTHER PUBLICATIONS

Reay et al., "Cooling of electronic components", Heat Pipes: Theory, Design and Applications, 6th Edition, 2014, Chapter 8, pp. 207-225.
Reay et al., "Historical development", Heat Pipes: Theory, Design and Applications, 6th Edition, 2014, Chapter 1, pp. 1-13.
Reay et al., "Special types of heat pipe", Heat Pipes: Theory, Design and Applications, 6th Edition, 2014, Chapter 6, pp. 135-173.
Reilly et al., "Utilization of Pore-Size Distributions to Predict Thermophysical Properties and Performance of Biporous Wick Evaporators", ASME Journal of Heat Transfer, Jun. 2014, vol. 136, pp. 061501-1-061501-10.
Richard et al., "Loop Heat Pipe Wick Fabrication via Additive Manufacturing", 47th International Conference on Environmental Systems, Jul. 16-20, 2017, ICES-2017-12, 10 pgs.
Rickman et al., "Considerations for the Thermal Modeling of Lithium-Ion Cells for Battery Analysis", 46th International Conference on Environmental Systems, Jul. 10-14, 2016, Vienna, Austria, ICES-2016-009, 17 pgs.
Ruiz et al., "JRC exploratory research: Safer Li-ion batteries by preventing thermal propagation", JRC Technical Reports, Workshop report: summary & outcomes, JRC Petten, Netherlands, Mar. 8-9, 2018, 53 pgs.
Sakamoto et al., "Development of Two-Phase Mechanically Pumped Fluid Loop with Large Isothermal Evaporator using Porous Wick Structure", 47th International Conference on Environmental Systems, ICES-2017-137, Jul. 16-20, 2017, 9 pgs.
Schweickart et al., "Testing of a controller for a hybrid capillary pumped loop thermal control system", Energy Conversion Engineering Conference, Proceedings of the 24th Intersociety, IEEE 1989, pp. 69-74.
Singh et al., "Battery Cooling Architectures for Electric Vehicles Using Heat Pipes", Joint 19th IHPC and 13th IHPS, Pisa, Italy, Jun. 10-14, 2018, 10 pgs.
Sunada et al., "A Two-Phase Mechanically Pumped Fluid Loop for Thermal Control of Deep Space Science Missions", 46th International Conference on Environmental Systems, ICES-2016-129, Jul. 10-14, 2016, 20 pgs.
Tsai et al., "Flat plate loop heat pipe with a novel evaporator structure", 21st IEEE Semi-Therm Symposium, 2005, 4 pgs.
Wan et al., "Heat transfer with flow and phase change in an evaporator of miniature flat plate capillary pumped loop", Journal of Thermal Science, Apr. 2007, vol. 16, No. 3, pp. 254-263.
Wilke et al., "Preventing thermal runaway propagation in lithium ion battery packs using a phase change composite material: An experimental study", Journal of Power Sources, 2017, First Published Nov. 22, 2016, vol. 340, pp. 51-59, doi: 10.1016/j jpowsour. 2016.11.018.
Wu et al., "Experimental investigation on the thermal performance of heat pipe-assisted phase change material based battery thermal management system", Energy Conversion and Management, Feb. 21, 2017, vol. 138, pp. 486-492, doi: 10.1016/j.enconman.2017.02. 022.
Yuan et al., "Inhibition effect of different interstitial materials on thermal runaway propagation in the cylindrical lithium-ion battery module", Applied Thermal Engineering, Feb. 25, 2019, vol. 153, pp. 39-502, doi: https://doi.org/10.1016/j.applthermaleng.2019.02.127.
Zhang et al, "Single-phase liquid cooled microchannel heat sink for electronic packages", Applied Thermal Engineering, Jul. 2005, vol. 25, pp. 1472-1487.

\* cited by examiner

THERMAL MANAGEMENT SYSTEMS FOR BATTERY CELLS AND METHODS OF THEIR MANUFACTURE

REFERENCE TO RELATED APPLICATIONS

This application claims priority to U.S. Provisional Patent Application No. 62/688,216, filed Jun. 21, 2018, the disclosure of which is incorporated herein by reference.

STATEMENT OF FEDERAL FUNDING

The invention described herein was made in the performance of work under a NASA contract NNN12AA01C, and is subject to the provisions of Public Law 96-517 (35 U.S.C. 202) in which the Contractor has elected to retain title.

FIELD OF THE INVENTION

The current disclosure is directed generally to thermal management systems for batteries and methods for their additive manufacture.

BACKGROUND OF THE INVENTION

Battery cells, such as lithium-ion batteries, are commonly used to power a wide range of systems, such as portable electronics, electric vehicles, and medical equipment. They are generally available in rectangular (i.e., pouch) and cylindrical shapes. The battery cells offer high energy density, but can create safety hazards if handled or manufactured improperly.

One example of improper battery cell handling is environmental abuse. Environmental abuse occurs when a battery cell is subjected to temperatures beyond its operational range, reducing its efficiency and potentially releasing a large amount of heat via a high-intensity exothermic reaction. Physical abuse (i.e., cell puncture) and manufacturing defects may also trigger the exothermic reaction. In systems with multiple batteries, the heat released from the exothermic reaction of one battery cell can spread to neighboring battery cells. This chain reaction is known as thermal runaway, and may lead to catastrophic fires and explosions. Thermal management systems mitigate temperature-related efficiency loss, hazardous exothermic reactions, and thermal runaway by securing a battery cell, or multiple battery cells, within a case containing at least a cooling element.

Battery cell thermal management systems generally employ air cooling, liquid coolant, or a combination of both to transfer heat away from the battery cells. These systems can be optimized by increasing their physical contact with individual battery cells.

BRIEF SUMMARY OF THE INVENTION

Many embodiments of the application are generally directed to thermal management systems for batteries and methods for their additive manufacture.

Various embodiments are directed to a thermal management system for batteries including:
   at least one battery holding compartment comprising:
      a non-porous interior wall defining the battery holding compartment configured to contain at least one battery cell, the non-porous interior wall being configured to conformally contact at least a portion of the at least one battery cell and configured to transport heat to or from the battery cell through conduction;
      a cavity disposed adjacent to the non-porous interior wall in a direction distal from the at least one battery cell;
      a non-porous exterior wall disposed adjacent to the cavity;
      a working fluid disposed within the cavity; and
      a heat transfer plate disposed in thermal contact on a first side with at least the working fluid, and on a second side with a cooling or heating environment; and
   wherein the at least one battery holding compartment, including at least the non-porous interior and exterior walls, and the heat transfer plate are all formed as a single continuous monolithic structure.

In various other embodiments, the material of each the non-porous interior wall and exterior wall is separately selected from the group consisting of alloys, ceramics, and plastics.

In still various other embodiments, the thickness of each of the non-porous interior wall and non-porous exterior wall ranges separately from 0.1 mm to 20 mm.

In yet various other embodiments, the surface roughness of the non-porous interior and non-porous exterior wall separately forms capillary channels of less than 500 µm.

In still yet various other embodiments, the working fluid is selected from the group consisting of water, acetone, ammonia, ethanol, methanol, heptane, toluene, perfluorocarbon fluids, and hydrofluorocarbon fluids such as R-134a.

In yet still various other embodiments, the cavity further includes:
   a porous wick; and
   a vapor space disposed adjacent to the porous wick;
   wherein the porous wick is an enclosed system configured to contain and cycle the working fluid between a liquid and a vapor phase, such that when the working fluid is in a liquid phase it saturates and travels through the porous wick allowing for the transfer of heat to or from the interior wall and the heat transfer plate, and such that when the working fluid is in a vapor phase it escapes the porous wick into the vapor space to transfer heat to or from the heat transfer plate; and
   wherein the thermal management system, including the porous wick, is formed as a single continuous monolithic structure.

In still yet various other embodiments, the porous wick is formed of a material selected from the group consisting of alloys, ceramics, and plastics.

In yet still various other embodiments, the surface roughness of the porous wick forms capillary channels of less than 500 µm.

In still yet various other embodiments, the porous wick has a variable porosity ranging from pore sizes on the order of 0.1 µm to pore sizes on the order of 100 µm.

In yet still various other embodiments, the porous wick includes at least one of:
   an interior porous wick disposed adjacent to and in physical contact with the interior wall;
   an exterior porous wick disposed adjacent to the vapor space; and
   at least one bridge porous wick connecting the interior porous wick and exterior porous wick.

In still yet various other embodiments, the thickness of the interior porous wick and exterior porous wick ranges separately up to 2 cm.

In yet still various other embodiments, each of the at least one bridge porous wicks has a separate thickness ranging from 0.1 mm to 2 cm.

In still yet various other embodiments, the systems further includes a plurality of bridge porous wicks, wherein the plurality of bridge porous wicks are arranged in a regular array between the interior porous wick and exterior porous wicks.

In yet still various other embodiments, the system further includes a plurality of bridge porous wicks, wherein the plurality of bridge porous wicks are distributed heterogeneously about a perimeter of the interior porous wick.

In still yet various embodiments, the system further includes at least one flow channel have a channel diameter greater than 100 micron, the at least one flow channel being incorporated into the porous wick such that working fluid may be transported therethrough In yet still various other embodiments, the system further includes:
 at least one flow channel;
 wherein the at least one flow channel is an enclosed system configured to contain and cycle the working fluid, allowing for the transfer of heat to or from the interior wall and the heat transfer plate; and
 wherein the thermal management system, including the at least one flow channel, is formed as a single continuous monolithic structure.

In still yet various other embodiments, the system further includes a plurality of battery holding compartments, wherein the plurality of battery holding compartments are formed as a single continuous monolithic structure.

In yet still various other embodiments, each of the adjacent battery holding compartments are fluidly interconnected such that working fluid may flow therebetween.

In still yet various other embodiments, each of the battery holding compartments in the plurality of battery holding compartments are separated by a thermal isolating structure disposed between at least a portion of the exterior walls of each two adjacent battery holding compartments.

In yet still various other embodiments, the thermal isolating structure defines a volume filled with a thermally isolating material selected from the group consisting of air, fiberglass, fiber, wool, wax, or a vacuum.

Some embodiments are directed to an additive manufacturing process for creating a single continuous monolithic thermal management system, the process including:
 the layer-by-layer deposition of at least one battery holding compartment including:
  a non-porous interior wall defining the battery holding compartment configured to contain at least one battery cell, the non-porous interior wall being configured to conformally contact at least a portion of the at least one battery cell and configured to transport heat to or from the battery cell through conduction;
  a cavity disposed adjacent to the non-porous interior wall in a direction distal from the at least one battery cell;
  a non-porous exterior wall disposed adjacent to cavity;
  a working fluid disposed within the cavity;
  a heat transfer plate disposed in thermal contact on a first side with at least the working fluid, and on a second side with a cooling or heating environment; and
 wherein the at least one battery holding compartment, including at least the non-porous interior and exterior walls, and the heat transfer plate are all formed as a single continuous monolithic structure.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 11a provides a schematic illustration of the testing apparatus for the heat coupon of a thermal management system for batteries in accordance with an embodiment of the invention.

FIG. 11b provides a data graph of the evaporation rate of liquid on a heat coupon in accordance with an embodiment of the invention.

FIG. 11c provides a data graph of the heat removed by a heat coupon in accordance with an embodiment of the invention.

FIG. 12a provides a data graph of temperature dissipation within a heat pipe array of a thermal management system for batteries in accordance with an embodiment of the invention.

FIG. 12b provides a data graph of temperature dissipation within a heat pipe array of a thermal management system for batteries in accordance with the prior art.

DETAILED DESCRIPTION OF THE INVENTION

Figure 1:
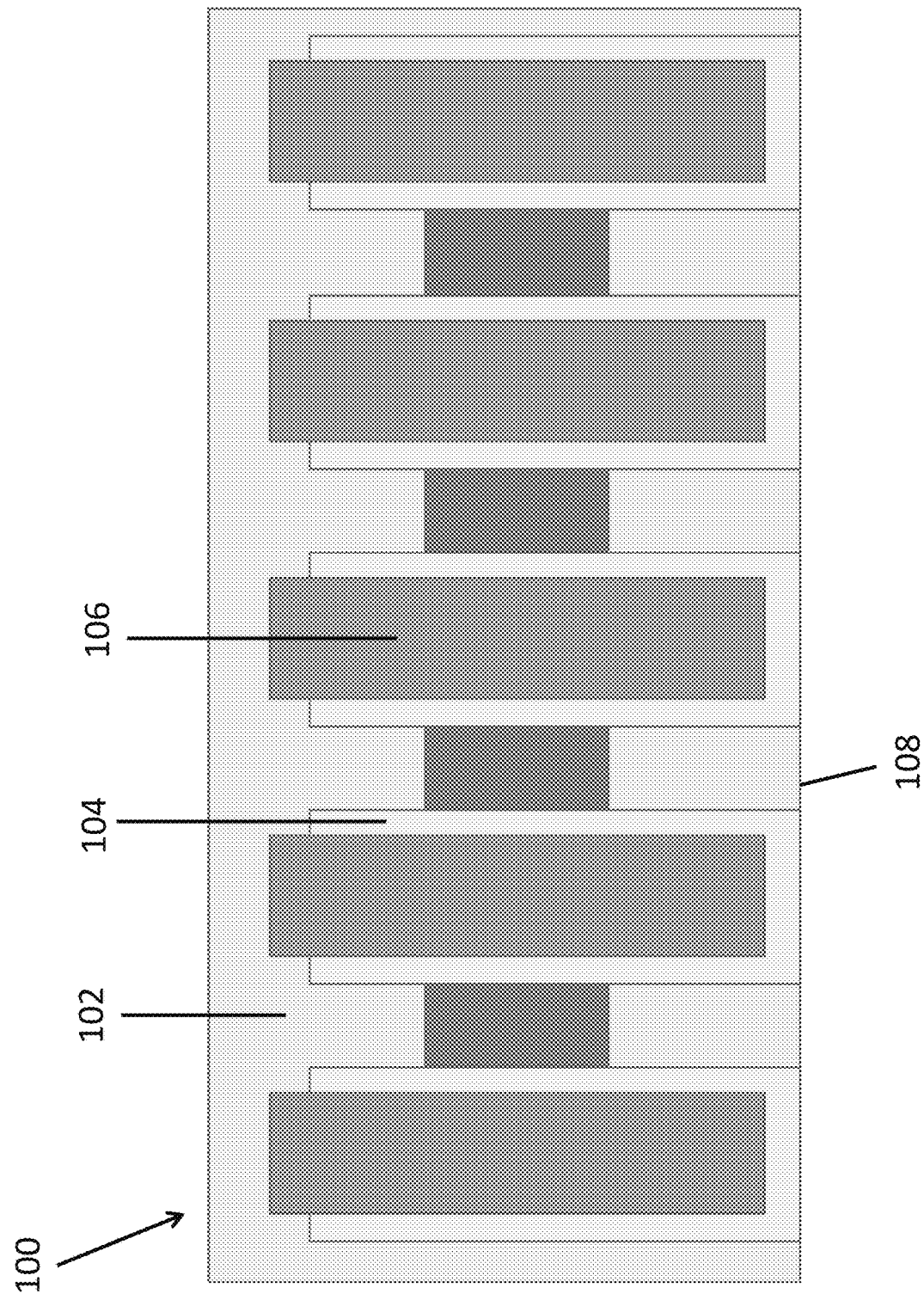
FIG. 1 provides a schematic illustration of a thermal management system for batteries in accordance with an embodiment of the invention.

Turning now to the drawings and data, thermal management systems for battery cells and methods for their additive manufacture in accordance with embodiments of the invention are provided. In a number of embodiments, the thermal management systems comprise at least one heat pipe that physically contacts the battery cell and conforms to its geometry. In such embodiments, at least one battery cell is deposited within each heat pipe, and each heat pipe is disposed on a base plate, which itself connects to a heat sink. In further embodiments, each heat pipe is thermally isolated from adjacent heat pipes by regions of low thermal conductivity disposed between the heat pipes. In many such embodiments, the heat pipe is a two-phase heat exchanger having three major components: liquid channels, wick elements, and vapor channels. In other embodiments, the wick component comprises a porous body configured to be disposed between the liquid channels and vapor channels. In several embodiments, the wick component has a variable porosity. In some such embodiments, the wick component may be made using a stochastic additive manufacturing process such that the wick component may take any configuration and/or such that the wick component may be directly integrated into the body of the heat pipe as a unitary piece thereof. In other embodiments, this unitary piece is part of a monolithic thermal management system. In still other embodiments, the heat pipe is a cavity with flow channels in which fluid can be pumped through. In some such embodiments, the fluid can occupy the heat pipe in a one-phase or two-phase state. In other embodiments, this unitary heat pipe is part of a monolithic thermal management system.

Although certain embodiments will be described in the following discussion, it will be understood that the nature of the liquid channels, wick elements, vapor channels, and flow channels may be modified as necessary to suit the required heat flow conditions.

In various embodiments, the battery cell thermal management system is disposed within a larger heat transfer system in association with suitable fluid transfer conduits, pumps, filters, etc. as will be readily configurable by those skilled in the art. During operation of embodiments of such thermal management systems, one or more heat pipes are disposed in such a fluid handling system and the interior shell of a heat pipe is placed into thermal contact with a surface the temperature of which is to be managed. In many embodiments, the heat pipes utilize a wick structure and are configured such that as the fluid fills the liquid channels, the wick becomes saturated with fluid, and the battery cell heats the wick. This heat evaporates the fluid at the surface of the wick and releases vapor into the vapor channels, spreading heat away from the battery cell. In other embodiments, the heat pipes utilize flow channels and are configured such that as fluid is pumped through the flow channels, the fluid picks up heat through a one-phase or two-phase heat transfer mechanism, spreading heat away from the battery cell. Various thermal management systems may interconnect adjacent heat pipes such that thermal management across an array of battery cells may be coordinated.

Thermal management systems have become critical to meet the growing need of efficiently and safely storing energy within batteries, while also enabling high charge and discharge rates. This is particularly true for lithium-ion batteries, which are used in wide-spread systems such as electric vehicles and cell phones. However, the current state-of-the-art for lithium-ion battery thermal management is wrought with inefficiencies. For example, current thermal management systems may incorporate fewer heat pipes than battery cells. Using one heat pipe to remove heat from a collection of cells is easier to manufacture, but also results in a decrease in the system's ability to dissipate heat from the batteries. Further, if one battery cell undergoes an undesired exothermic reaction, the reaction may propagate to neighboring cells within the same heat pipe, creating thermal runaway.

Conventional thermal management systems that remove heat on an individual cellular level sometimes employ non-monolithic heat pipes with sintered or screen-based wicks (i.e., the heat pipes are separate structures integrated into the base plate). (See Singh, et al., Battery Cooling Architectures for Electric Vehicles Using Heat Pipes, 8 (2018), the disclosure of which is incorporated herein by reference.) This results in limitations to the system geometry. In addition, being a separate element, additional thermal interfaces are introduced which have significant influence on the heat transfer efficiency of the system. Finally, conventional wick elements (sintered wicks, screen-based wicks, or grooves) cannot precisely and accurately control the variability of the porosity through the media.

Embodiments of the instant disclosure are directed to thermal management systems for batteries and methods for their additive manufacture. Many such embodiments enable the creation of a monolithic thermal management structure that promotes efficient operation of battery cells and/or mitigates the risk of thermal runaway.

Further, many embodiments of the instant disclosure are specifically directed to thermal management systems for battery arrays and methods of their additive manufacture. Battery arrays may be necessary to meet high energy or power needs of a particular system (e.g., electric cars). The high energy and power density of these battery arrays significantly increases the importance of their thermal management. Improper thermal management can lead to thermal runaway of the array. The many embodiments of the instant disclosure mitigate the possibility of thermal runaway due to the efficient monolithic thermal management structure discussed above, which also incorporates an isolating structure that limits thermal communication between battery cells. In other embodiments of the instant disclosure, thermal runaway is not of concern. In such embodiments, the thermal management structure discussed above can be designed to control the temperature of the battery array to optimize the array's performance and/or to reduce battery degradation.

Battery Thermal Management System Structure

A thermal management system for batteries in accordance with many embodiments of the invention facilitates safe and efficient battery operation by influencing battery temperature. In one such embodiment that facilitates cooling, for example, the outer shell of the wick component fully conforms to and contacts the outer wall of the battery cell, which allows the fluid in the wick component to evaporate and transfer excess heat away from the battery and into a heat sink. In another embodiment that facilitates heating, the same contact occurs between the fluid in the wick component and battery, which allows the fluid in the wick component to transfer heat from the heat sink and onto the battery cell wall. Many such embodiments accomplish this heat transfer mechanism through the use of a working fluid within the wicking component.

In many embodiments, the entire thermal management system from the outer non-porous wall, through the wick/heat pipe structure to the inner non-porous wall configured to form the battery compartment are formed as a monolithic structure. For the purposes of this specification, monolithic means that the structure is formed without joints or interfaces between components such that it is manufactured as a single continuous piece.

A thermal management system for batteries in accordance with an embodiment of the invention is illustrated in FIG. 1. The thermal management system generally comprises 100 a monolithic additively manufactured case 102 that includes at least one heat pipe 104. Heat pipes according to many embodiments are configured to accommodate at least one battery cell 106 and conformally encapsulate at least a portion of each battery cell thus accommodated. Although heat pipes configured to hold cylindrical battery cells, according to various embodiments such heat pipes may be configured according to the geometry of the battery cell (e.g., cylindrical heat pipe configuration for a cylindrical battery cell, rectangular configuration for a pouch battery cell, etc.). The at least one heat pipe of such thermal management systems are configured to be physically connected to a base plate 108, which in turn may be thermally connected to a heat sink (not shown). In many embodiments, a plurality of heat pipes can share a common base plate. In other embodiments, the base plate may be segmented such that each cell has its own base plate, and all the base plates are thermally insulated from each other.

Many embodiments of the invention incorporate additive manufacturing techniques in order to form monolithic structures. In some such embodiments, a number of different 3-D printing techniques including, for example, melting techniques, binder jetting or curing with photoresins, electron beam and selective laser sintering, etc. may be used to produce metal, plastic, or ceramic structures that are compatible with the working fluid and that have sufficient strength to support temperature and pressure gradients within the system and/or to protect the battery cells from physical abuse. While additive manufacturing techniques are described above, it will be understood that these techniques may be combined with other steps and techniques to form the final thermal management system. For example, in some embodiments additional machining steps may be used, such as, for example, machining, grinding and smoothing to obtain a desired outer surface smoothness or shape of, for example, the battery compartment to ensure good thermal contact between the battery and the thermal management system. Thermal transfer compounds may also be used in assembling the battery into the thermal management system to further increase thermal contact, for example, between the battery and thermal management system.

The additive manufacturing process in accordance with embodiments of the invention allows the manufacturer to select materials and the component geometry based on the desired heat transfer attributes. In one such embodiment, for example, the non-porous walls of the heat pipe, the porous wick component of the heat pipe, and the base plate can be made of one or more materials selected from the group of alloys, ceramics, and plastics. Although this specific material scheme is put forth, any of a variety of material schemes can be utilized to form a monolithic thermal management system in accordance with embodiments of the invention. Moreover, it will be understood that each element may comprise a varying mix of suitable materials, such mixtures may be achieved using gradual variation in deposited compositions or abrupt transitions as desired for a specific set of thermal management properties.

Heat Pipe Structure

A heat pipe of a thermal management system for batteries in accordance with many embodiments of the invention accomplishes heat transfer by pumping fluid through flow channels within the heat pipes. The pumped fluid either takes heat away from the battery cell or transfers heat to the battery cell. The flow channels can accommodate both one-phase and multiple-phase working fluids. For example, the working fluid may be in or close to a two-phase liquid-vapor mixture.

Figure 2:
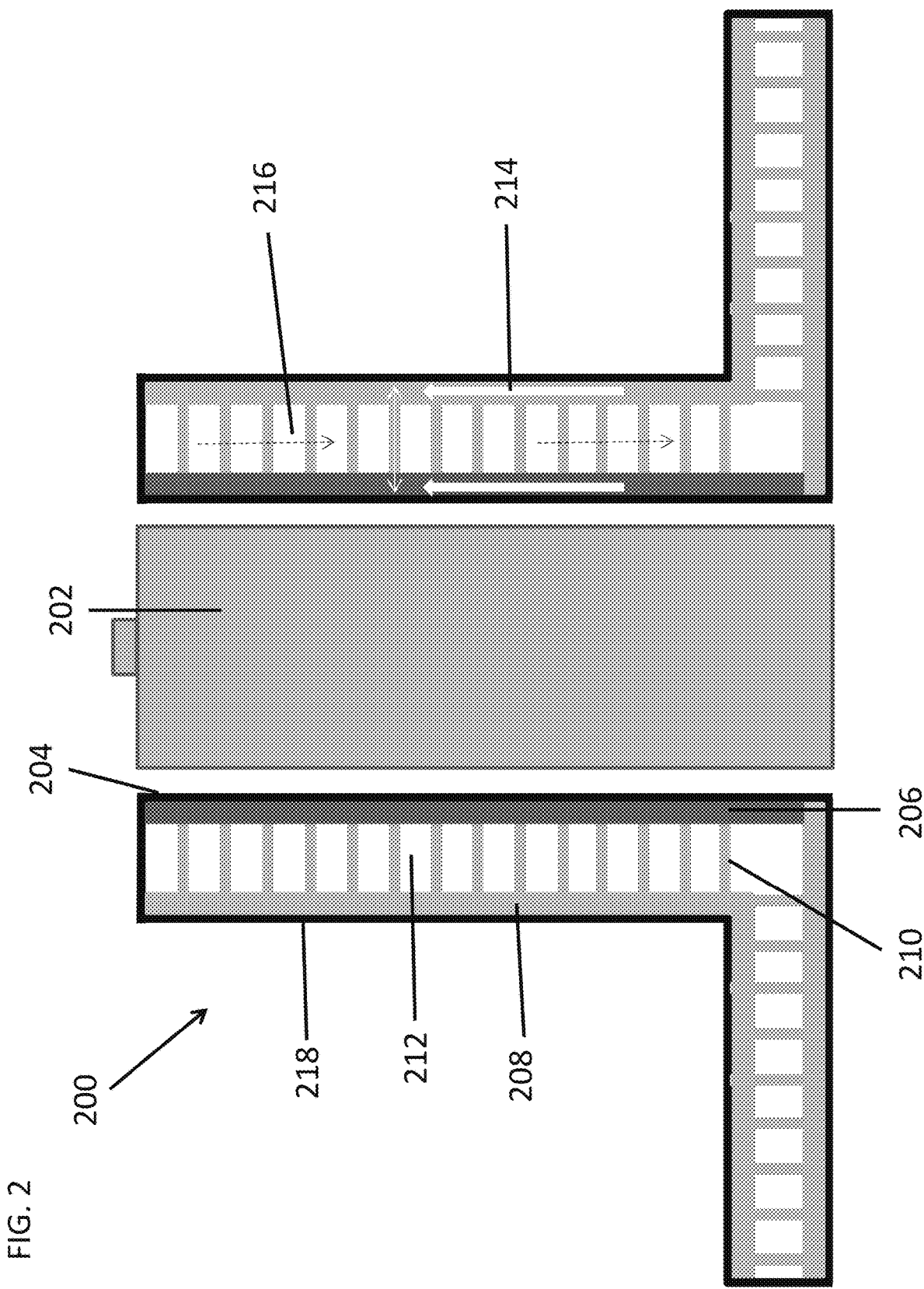
FIG. 2 provides a vertical cross-sectional schematic illustration of a heat pipe of a thermal management system for batteries in accordance with an embodiment of the invention.

A heat pipe of a thermal management system for batteries in accordance with other embodiments of the invention is illustrated in FIG. 2. Such embodiments contain monolithic heat pipes 200 that function to either transfer heat away from the battery cell 202 or transfer heat onto the battery cell 202 through the medium of a working fluid. This monolithic structure contains a number of components formed within the single continuous monolithic structure. The solid interior shell 204 physically contacts the battery 202 and either absorbs excess battery heat or transfers heat onto the battery. The interior shell 204 also prevents the working fluid within the wick component from leaking onto the battery. It will be understood that the wick component, in many embodiments of the invention, may only comprise a single porous structure in thermal communication with both the interior shell 204 and heat sink. However, the wick component in other embodiments in accordance with FIG. 2 may comprise three porous elements: an interior wick 206 in closest proximity to the battery cell, an exterior wick 208 in furthest proximity to the battery cell, and a bridge wick 210 that connects the interior and exterior wicks across a vapor space 212. The wick structure is saturated with a working fluid through capillary action 214. In accordance with the embodiments of the invention that intend to remove heat from the battery, the working fluid reaches the wick pores and evaporates as it is heated by the interior shell. The evaporated working fluid 216 flows through the vapor channels 212 and condenses once its thermal energy is transferred to the heat sink. The solid exterior shell 218 prevents the working fluid from leaking outside of the thermal management system.

Figure 3:
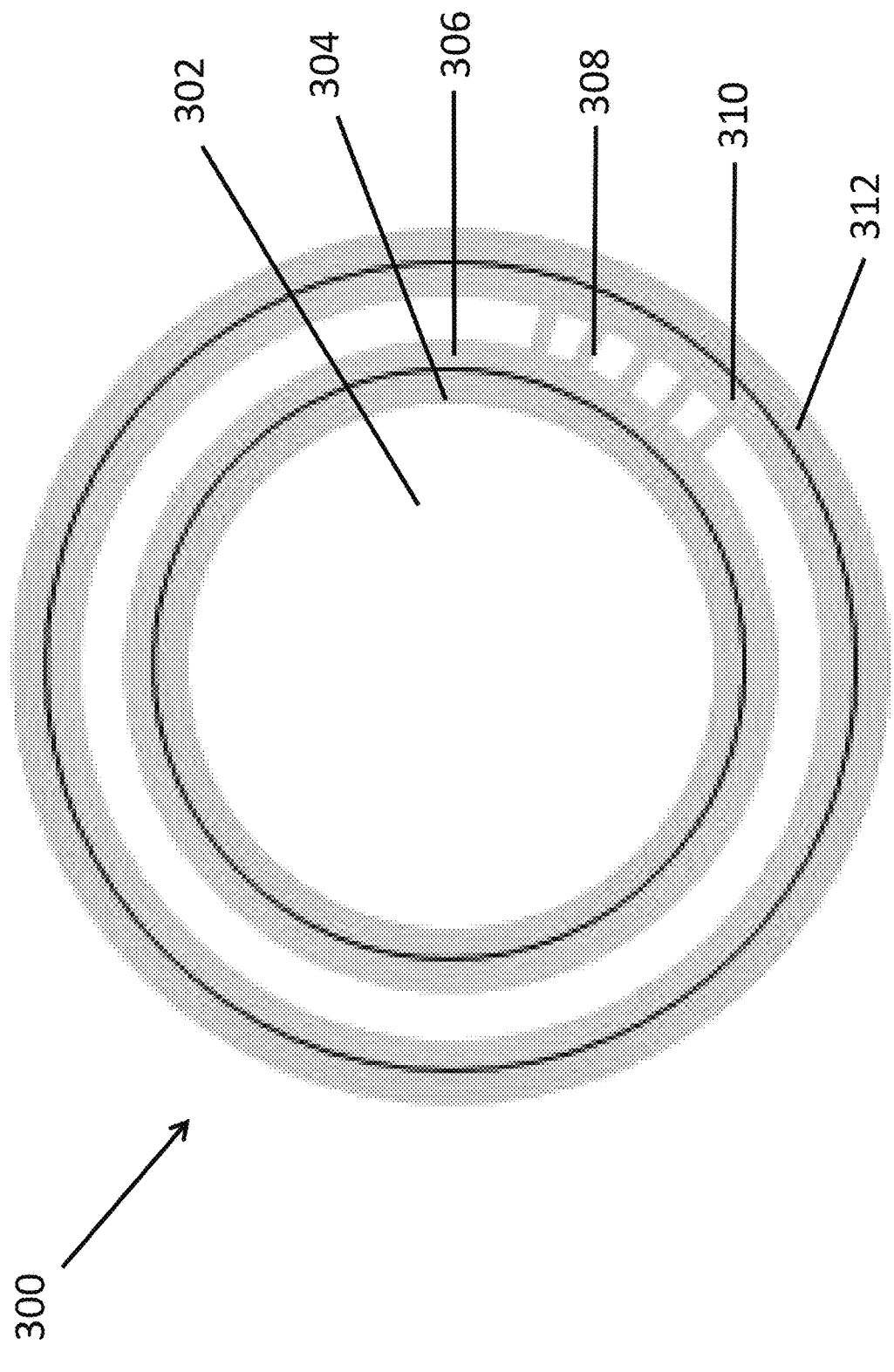
FIG. 3 provides a horizontal cross-sectional schematic illustration of a heat pipe of a thermal management system for batteries in accordance with an embodiment of the invention.

A heat pipe of a thermal management system for batteries in accordance with many embodiments of the invention is illustrated in FIG. 3. This illustration comprises the same heat pipe components as those discussed illustrated in FIG. 2, but through the lens of a horizontal plane cross-section. Namely, the heat pipe 300 comprises a compartment for a battery 302, interior shell 304, interior wick 306, bridge wick 308, exterior wick 310, vapor channels 312, and exterior shell 314.

Figure 4:
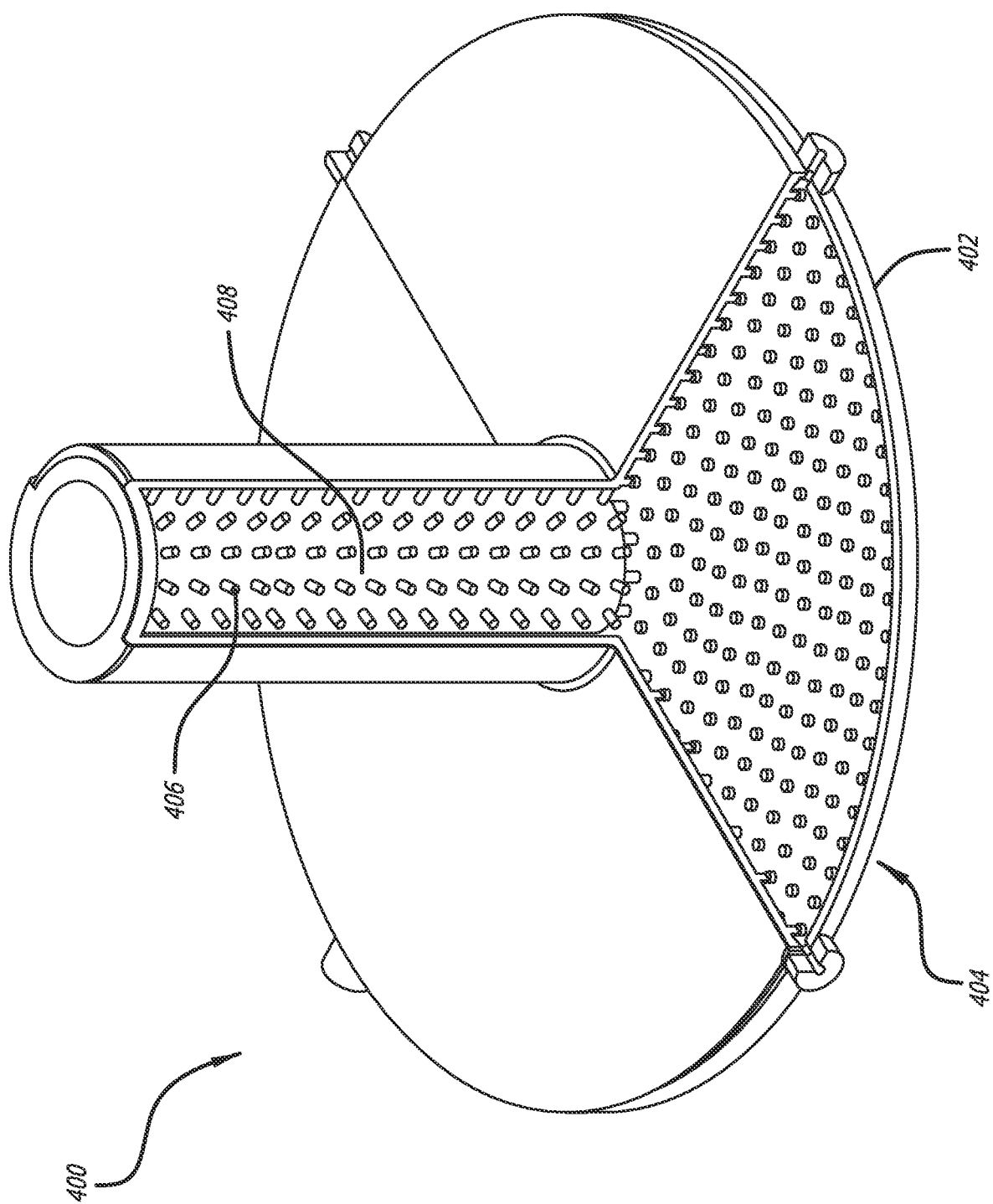
FIG. 4 provides a schematic illustration of a heat pipe of a thermal management system for batteries in accordance with an embodiment of the invention.

In many embodiments of the invention, at least one heat pipe is monolithically connected to a base plate, which thermally connects to the heat sink. In some such embodiments, the heat sink can be embedded directly into the baseplate. A heat pipe and corresponding base plate of a thermal management system for batteries in accordance with an embodiment of the invention is illustrated in FIG. 4. According to many embodiments, both the heat pipe 400 and the base plate 402 comprise one or more liquid channels, wick components, vapor channels, and flow channels. The cutaway 404 portion of FIG. 4 illustrates a portion of an exemplary inner structure for a heat pipe showing an exemplary arrange of wick components 406 and vapor channels 408. Although one specific wick scheme is put forth in the cutaway 404, any of a variety of wick schemes can be utilized in accordance with embodiments of the invention.

Figure 5:
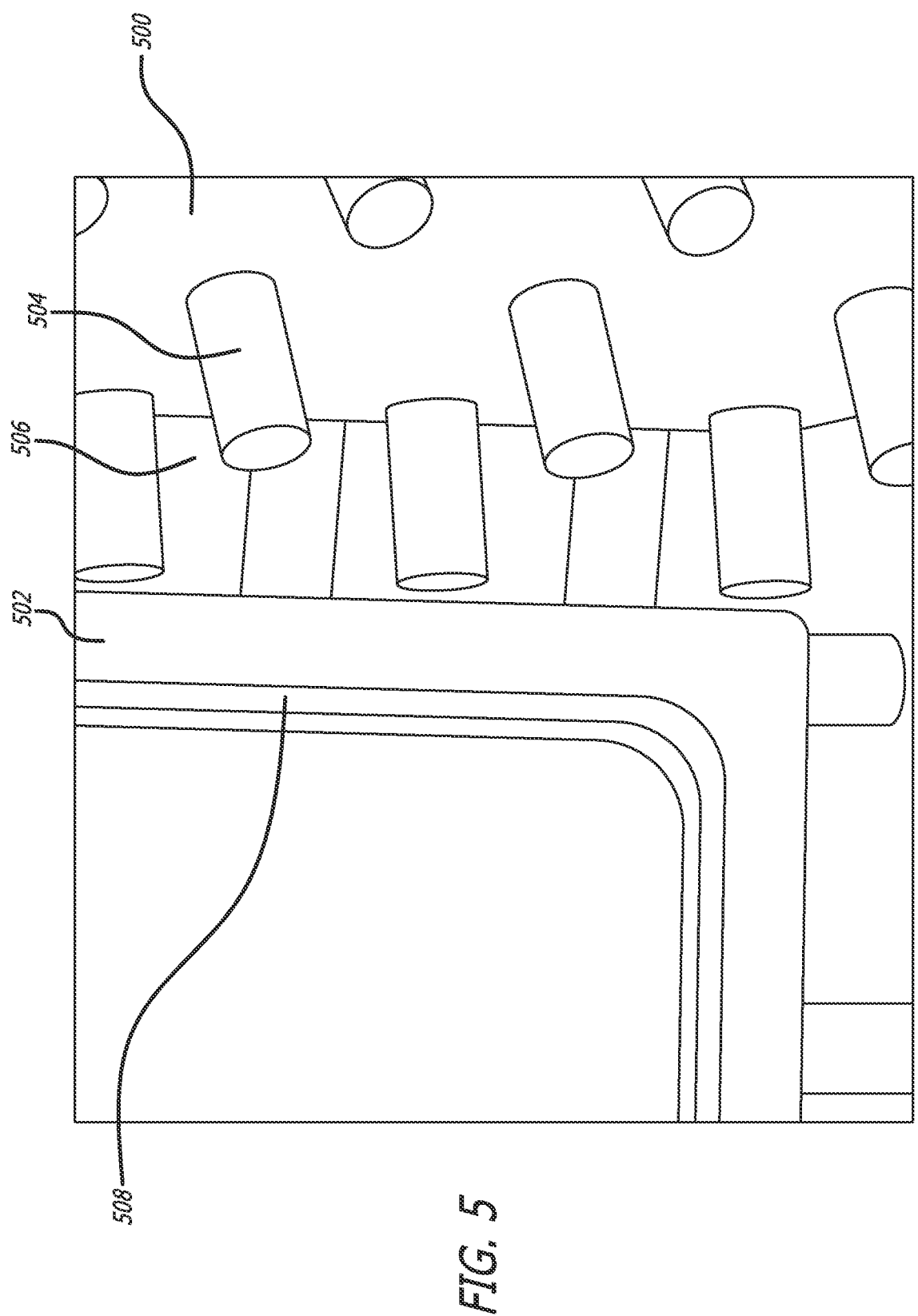
FIG. 5 provides a schematic illustration of the wicking structure within the heat pipe of a thermal management system for batteries in accordance with an embodiment of the invention.

A magnified view of the wick elements in accordance with an embodiment of the invention is illustrated in FIG. 5.

As previously discussed, in some embodiments, the wick component may comprise three elements: an interior wick 500 in closest proximity to the battery cell, an exterior wick 502 in furthest proximity to the battery cell, and a bridge wick 504 that connects the interior and exterior wicks across a vapor space 506. As previously discussed, the exterior wick 502 is encased by the solid exterior shell 508. All three wick elements can be porous, and in some embodiments, each can display variable porosity. This includes variance between regions of one wick element as well as variance between the wick elements themselves. For example, in one embodiment of the invention, the interior wick 500 exhibits smaller pore sizing in relation to the exterior wick 502. In another embodiment of the invention, all three wick elements exhibit smaller pore sizing in the regions surrounding the contacts of the battery cell in relation to the regions surrounding the remainder of the battery cell. In yet another embodiment of the invention, the wick has macroscopic flow channels embedded within it to increase the permeability of the liquid flow path. The ability to vary porosity in the wick elements allows for optimization of the thermal management system's heat transfer capabilities, which ultimately keeps the battery at a safe and efficient operating temperature.

Conventional methods of manufacturing impose geometric limitations on the heat pipe structures within thermal management systems. In contrast, the additive manufacturing process in accordance with many embodiments of the invention bypass these geometric limitations. As a result, the liquid channels, vapor channels, wick components, and flow channels of the heat pipes in accordance with many embodiments of the invention are not geometrically restricted. Additionally, interior and exterior shell components can have a thickness ranging from 0.1 mm to 20 mm. In many embodiments, the base plate is also not geometrically restricted. Embodiments of such base plates may further comprise or be monolithically interconnected with other heat-transferring features such as, for example, high surface area cooling structures such as cooling fins. Further embodiments may include heat absorbing media (such as a phase change material) incorporated into or adjacent the base plate to absorb heat. Although these specific heat sink schemes are put forth, any of a variety of heat sinks can be monolithically connected to the base plate in accordance with embodiments of the invention.

The absence of geometric restrictions for the heat pipe according to embodiments of the invention allows the manufacturer to control several wick component parameters. Interior and exterior wick elements can have a thickness up to 2 cm, and bridge wick elements can have a thickness ranging from 0.1 mm to 2 cm. For example, in some embodiments where only an interior wick or exterior wick is desired, the manufacturer can form the wick structures into a thin, rough surface that can exhibit surface capillary pumping. In other embodiments where the wick component comprises an interior wick, exterior wick, and bridge wick, the manufacturer can control the shape and number of bridge wicks interconnecting the interior and exterior wick elements. In one such embodiment, the heat pipe can be additively manufactured with fewer bridge wicks to create larger vapor channels or larger numbers of bridge wicks to increase fluid flow between a specific region of the heat pipe. In addition to the number of bridge wicks, the size and shape of such wick structures can also be controlled to modify the heat carrying capacity at a specific point of the battery cell, e.g., having thicker bridge wicks to increase surface area or fluid flow, or altering the outer contour to hexagonal, rectangular, etc. shapes to provide greater or fewer edge effects. Similarly, in another such embodiment, the heat pipe can be additively manufactured with a thicker interior wick and a thinner exterior wick to provide greater or smaller volumes of pore structures for fluid to flow through. The interior or exterior wicks may also be tapered along there length. Although these specific wick schemes are put forth, it will be understood that any of a variety of wick schemes can be utilized in accordance with embodiments of the invention.

Conventional methods of manufacturing also impose porosity limitations on the wicking elements within thermal management systems. Namely, porosity tends to be uniform, rather than varied among the wick elements. In contrast, the additive manufacturing process in accordance with many embodiments of the invention bypasses these porosity limitations. As a result, the wick elements of the heat pipes in accordance with many embodiments of the invention can be manufactured to meet specific, rather than generic, heat transfer needs.

In various embodiments, the additively manufactured wick component exhibits variable porosity, with porosity ranging from 5% porous to 80% porous, and pore sizes ranging from the order of 0.1 μm to the order of 100 μm. This variable porosity allows the manufacturer to control the wick component's capillary pumping and permeability properties. In one such embodiment, the interior wick is additively manufactured with pore sizes on the order of 1 μm to exhibit high capillary pumping, while the exterior wick is additively manufactured with pore sizes on the order of 100 μm to exhibit high permeability. In another such embodiment, the interior wick is additively manufactured with large pore sizes in its center, creating flow channels inside the wick, and smaller pore sizes at its surface. Although these specific porosity schemes are put forth, any of a variety of porosity schemes can be utilized in accordance with embodiments of the invention.

Heat Pipe Materials and Working Fluids

Figure 6:
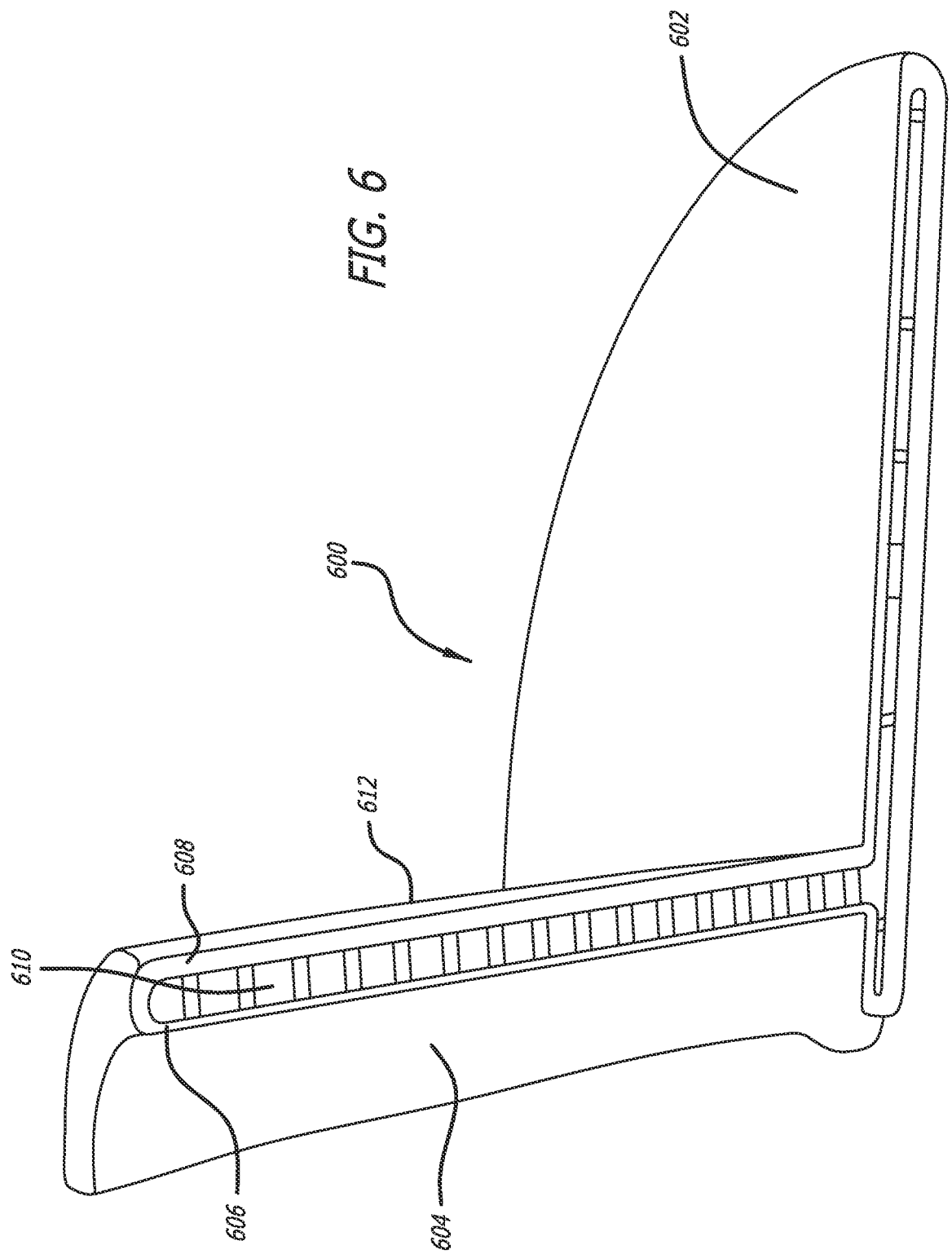
FIG. 6 provides an image of a heat pipe segment of a thermal management system for batteries additively manufactured in accordance with an embodiment of the invention.

A monolithic additively manufactured heat pipe in accordance with an embodiment of the invention is illustrated in FIG. 6. As previously discussed, in many embodiments, the heat pipe 600 is monolithically connected to the base plate 602 and comprises the following elements: an interior shell 604, an interior wick 606, an exterior wick 608, a bridge wick 610, and an exterior shell 612.

Although the wick structures in previous figures are shown as having smooth outer surfaces, it will be understood that these surfaces may be microtextured or roughened to increase external surface area and create surface flow features. In many embodiments, the wick elements can be roughened to create capillary channels less than 500 μm in diameter. Although this specific micro-texturing scheme is put forth, any of a variety of micro-texturing schemes can be utilized in accordance with embodiments of the invention.

In various embodiments, the non-porous shell, porous wick, and base plate materials are selected to exhibit high conductivity and sufficient strength to resist deformation from the pressure and temperature loads within the heat pipe. In many embodiments, such properties are exhibited in alloys, ceramics, and plastics. Although these specific materials are put forth, any of a variety of materials can be utilized in accordance with embodiments of the invention.

In many embodiments, the working fluid is selected to exhibit compatibility with the non-porous shell, porous wick, and base plate materials, and specific phase change properties. To be compatible, the working fluid must not adversely affect the heat exchanger performance (e.g., contributes to condenser blockage, corrosive to materials in the system, etc.). In many embodiments that remove heat from the interior shell, the working fluid must exist in a liquid phase near the operating temperature of the heat sink, and in a vapor phrase near the operating temperature of the interior shell. In another such embodiment, the working fluid is selected from the group consisting of water, acetone, ammonia, ethanol, methanol, toluene, heptane, perfluorocarbon fluids such as perfluoromethylcyclohexane, and hydrofluorocarbon fluids such as R-134a. Although this specific set of working fluids is put forth, any of a variety of working fluids can be utilized in accordance with embodiments of the invention.

Thermal Array Structure

In many embodiments of the invention, the monolithic thermal management system comprises a plurality of heat pipes, which form a thermal array. In such embodiments, the thermal array may comprise heat pipes that are completely isolated from other heat pipes in the array. In still other embodiments, the thermal array may comprise heat pipes that maintain thermal communication with other heat pipes in the array.

Figure 7:
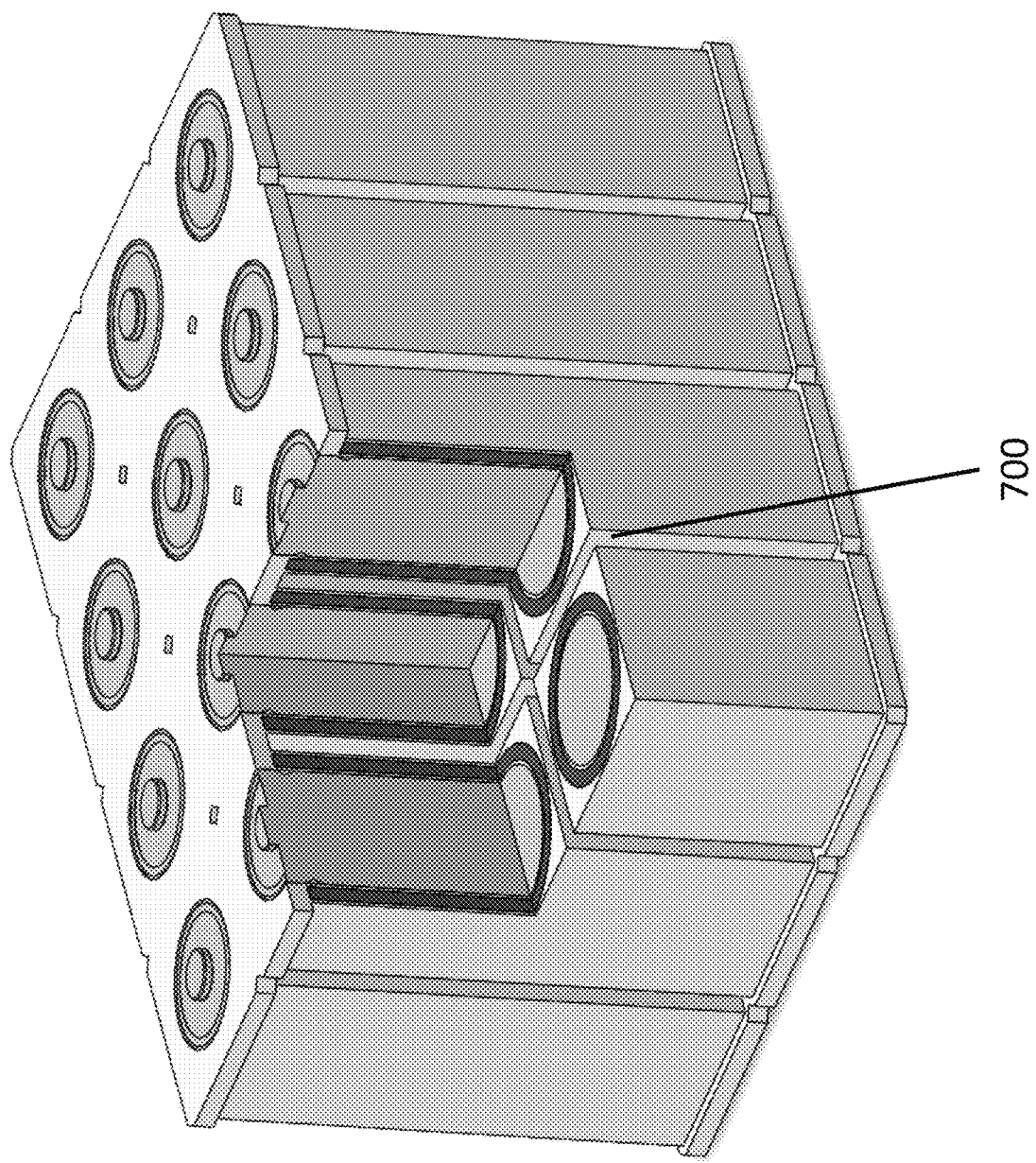
FIG. 7 provides a schematic illustration of a thermal management system for batteries with heat pipes and battery cell isolating features in accordance with an embodiment of the invention.

A monolithic thermal array comprising of heat pipes that are completely isolated from other heat pipes in the array in accordance with many embodiments of the invention is illustrated in FIG. 7. Such embodiments may contain an isolating feature 700 disposed between the separate battery cells, configured to minimize thermal communication between heat pipes. As previously discussed, this isolating feature addresses increased thermal management concerns in a system with high energy density. If one battery cell in the system fails and undergoes an exothermic reaction, a hazardous chain reaction may occur with improper thermal management. Specifically, the heat released from the exothermic reaction of the failed battery cell can propagate to neighboring battery cells, causing those battery cells to fail and undergo their own exothermic reaction. The release of energy in this chain reaction can be substantial. The isolating feature in accordance with many embodiments of the invention is designed to mitigate this thermal runaway scenario.

The isolating feature in accordance with many embodiments of the invention is monolithically connected to the heat pipes and base plate of the thermal management system and comprises a region of low conductivity or great heat absorption characteristics. In many embodiments of the invention, the low conductivity region may comprise a gas, a porous material, or a non-porous material. In several such embodiments, the region may comprise a combination of gases, porous materials, and non-porous materials. In still other such embodiments, the region may also be a vacuum. In one such embodiment, the isolating feature is selected from the group consisting of air, fiberglass, fiber, wool, or an organic, inorganic, eutectic, hygroscopic or solid-solid phase change material, such as, for example wax. As listed above, a material with significant heat absorption characteristics such as a material that undergoes a phase change may be interposed between the cells of the battery. For example, a wax that undergoes a phase change from solid to liquid at a relevant temperature may be used to absorb heat from a given cell. This could be especially useful for assisting the prevention of thermal runaway. In some such embodiments, a reservoir may be included within the thermal management system to store such materials during, for example, their liquid phase. Although a specific set of materials is put forth for these isolation features, any of a variety of materials can be utilized in accordance with embodiments of the invention.

In other embodiments, a monolithic thermal array comprises heat pipes that maintain thermal communication with other heat pipes in the array through connection to a shared base plate component in accordance with many embodiments of the invention. Such embodiments may contain an isolating feature disposed between the separate battery cells, configured to limit, but not eliminate, thermal communication between heat pipes. The increased degree of thermal communication in comparison to the completely isolated thermal array described above may allow for greater ease of manufacturing and thermal efficiency of the system.

Figure 8:
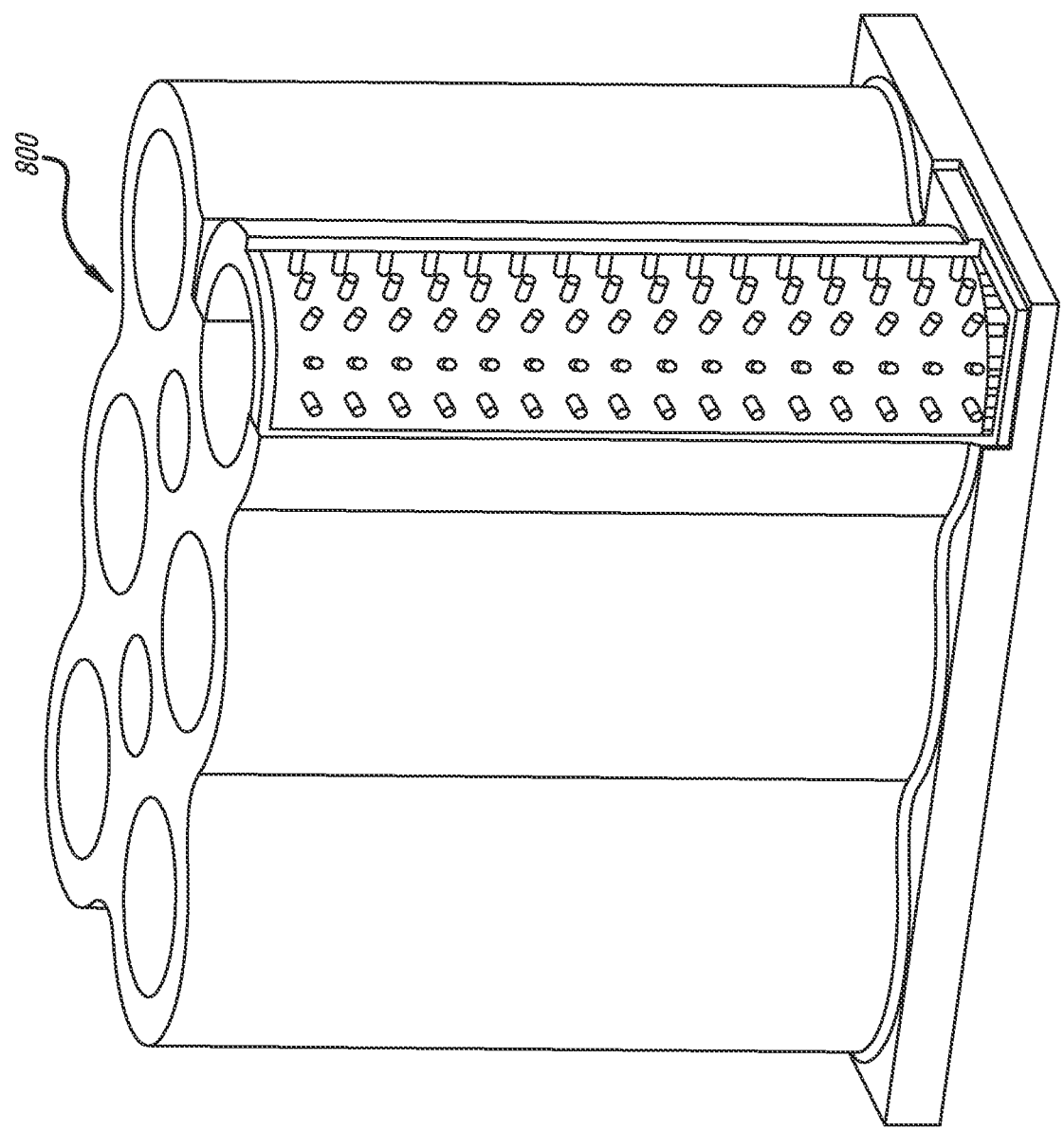
FIG. 8 provides a schematic illustration of a thermal management system for batteries with interconnected heat pipes in accordance with an embodiment of the invention.

A monolithic thermal array comprising of heat pipes that are directly interconnected to other heat pipes in the array in accordance with many embodiments of the invention is illustrated in FIG. 8. Such embodiments are configured to maximize thermal communication between heat pipes. The increased degree of thermal communication in comparison to the isolated thermal arrays described above may allow for greater ease of manufacturing and thermal efficiency of the system.

EXEMPLARY EMBODIMENTS

The following discussion sets forth embodiments where additively manufactured thermal management systems for battery cells may find particular application. It will be understood that these embodiments are provided only for exemplary purposes and are not meant to be limiting.

Example 1: Studies of Additively Manufactured Properties of a Single Heat Pipe

Figure 9:
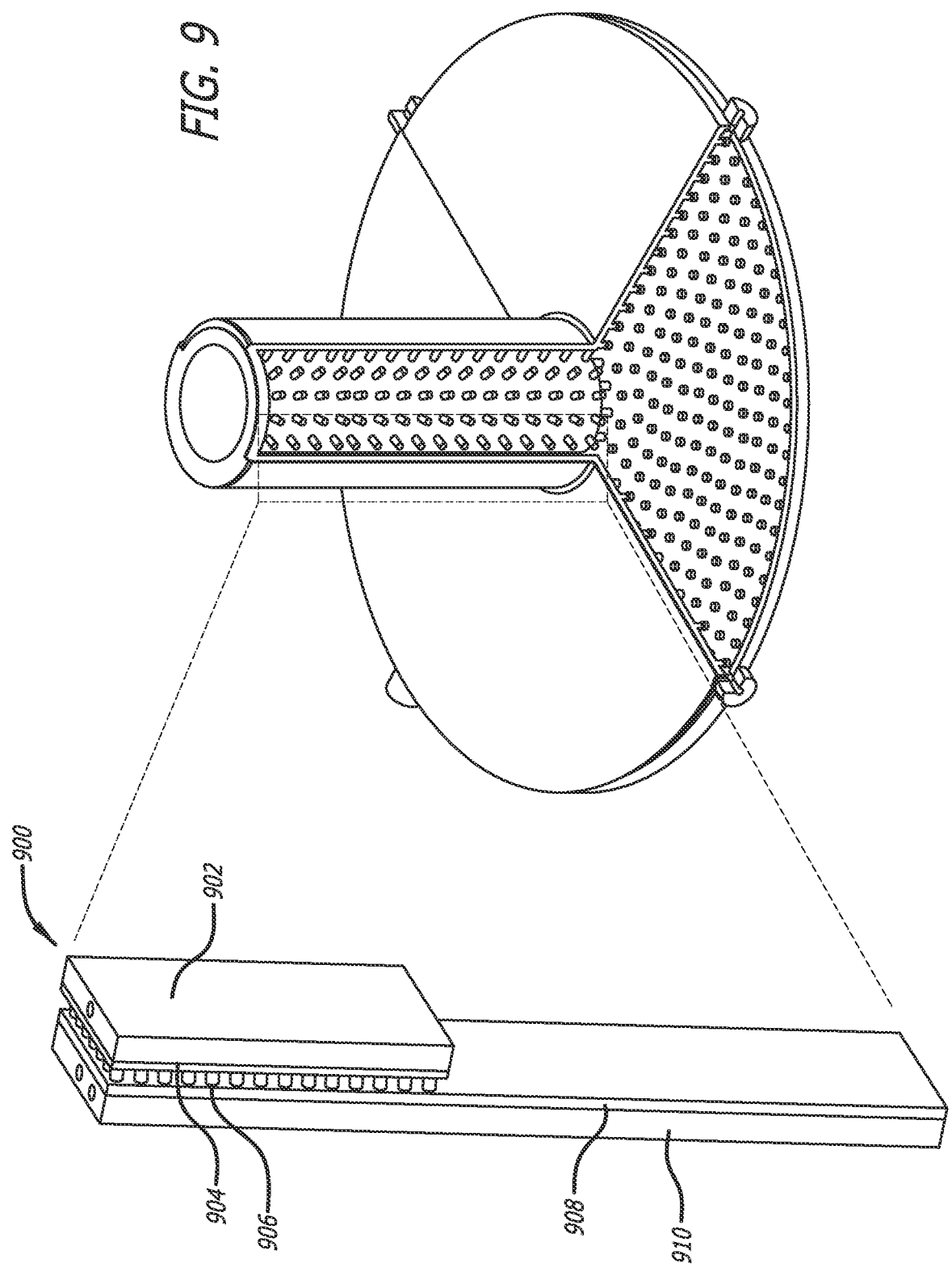
FIG. 9 provides a schematic illustration of comparing the structure of a heat pipe of a thermal management system for batteries to an experimental heat coupon of a thermal management system for batteries in accordance with an embodiment of the invention.

Representative portions of monolithic heat pipes (hereinafter referred to as "heat coupons") according to embodiments were studied to determine the structure's ability to remove heat from a heat source. A heat coupon in relation to a heat pipe in accordance with many embodiments of the invention is illustrated in FIG. 9. The heat coupon 900 contains components of the many heat pipe embodiments previously discussed; namely, an interior shell 902, interior wick 904, bridge wick 906, exterior wick 908, and exterior shell 910.

Figure 10:
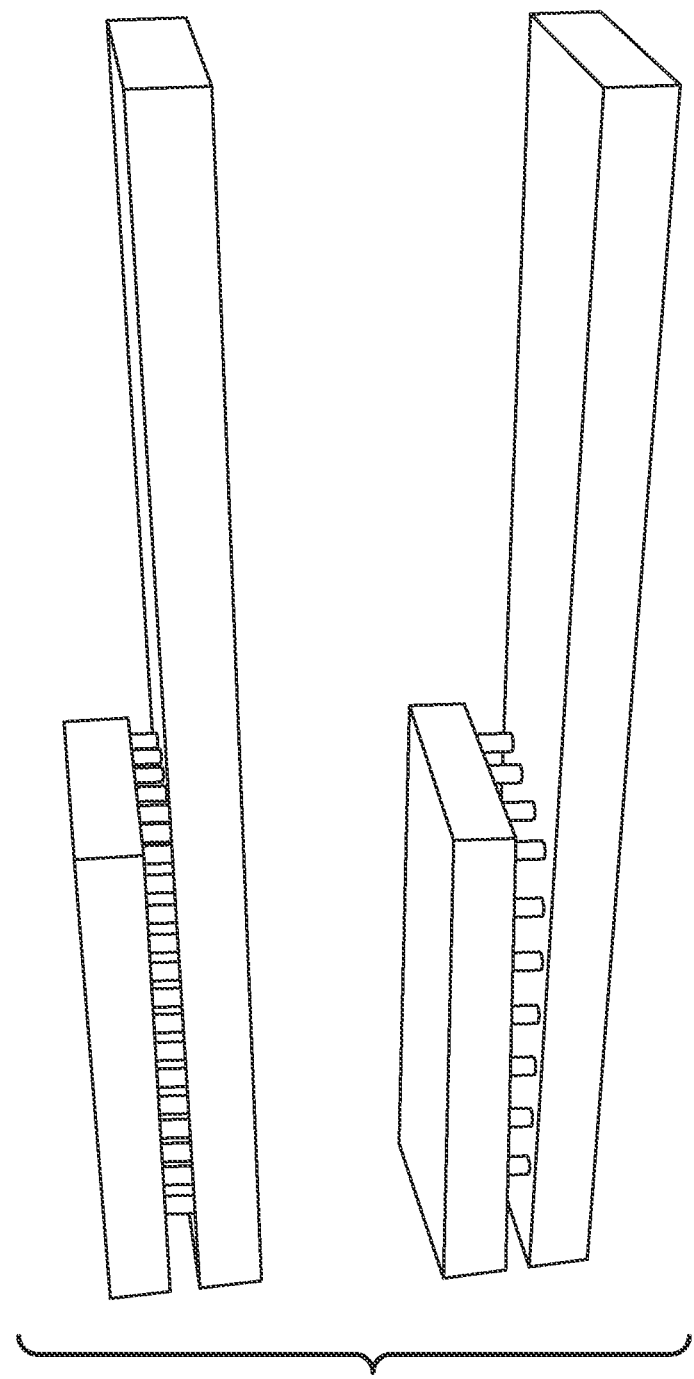
FIG. 10 provides an image of a heat coupon of a thermal management system for batteries additively manufactured in accordance with an embodiment of the invention.

A representative additively manufactured monolithic heat coupon in accordance with many embodiments of the invention is illustrated in FIG. 10. The heat coupon was additively manufactured using direct metal laser sintering with aluminum alloy $AlSi_{10}Mg$.

A representative testing apparatus for heat coupons in accordance with many embodiments of the invention is illustrated in FIG. 11a. The working fluid 1100 saturated the wick component 1102 throughout the testing. Tests were performed by applying heat to the interior shell 1104 and measuring several heat transfer attributes of the heat coupon structure. FIGS. 11b and 11c provide the results of the heat transfer experiments. Specifically, FIG. 11b shows that embodiments of the invention respond to an increased heat load by increasing the rate of working fluid evaporation. FIG. 11c shows that embodiments of the invention remove a substantial portion of the heat applied to the interior shell through the mechanisms of working fluid evaporation and conduction.

Example 2: Studies of Additively Manufactured Properties of an Array of Heat Pipes Arrays of battery cells increase the energy density of the battery system and increase the importance of effective thermal management. In some embodiments of the invention, thermal management systems as described are designed to house such an array. The following study was performed to demonstrate the thermal management system's ability to dissipate heat locally, when the system houses an array of batteries in accordance with many embodiments of the invention. The system's ability to dissipate heat locally is directly linked to the system's ability to mitigate thermal runaway, because local heat dissipation implies that residual heat from one battery cell does not propagate to neighboring battery cells. As previously discussed, this heat propagation is a common cause of thermal runaway.

A thermal management system with an array of batteries in accordance with many embodiments of the invention is illustrated in FIG. 7. An engineering thermal model was created using the system in FIG. 7 to simulate the beginning of a thermal runaway scenario. Specifically, twice the expected heat released from a lithium-ion battery cell's exothermic reaction was applied to one battery cell of the thermal model over the period of 20 seconds. The transient temperature of the thermal model showed that the heat pipe and isolating feature mitigated the propagation of heat to neighboring cells, and most of the heat dissipated in less than 30 seconds. Graphical results of the peak case temperature are shown in FIG. 12a. Adjacent cells had minimal temperature increase. For comparison, half of the heat release defined above was applied to one battery cell of a thermal model that contained no heat pipe or thermally isolating feature over the period of 10 seconds. The transient temperature of the thermal model showed significant heat propagation to neighboring cells and a less efficient ability to transfer heat away from the simulated exothermic reaction. Graphical results of the peak case temperature are shown in FIG. 12b. In both cases, the heat sink temperature was 40° C.

Doctrine of Equivalents

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A thermal management system for batteries comprising:
    at least one battery holding compartment comprising:
        a non-porous interior wall defining the battery holding compartment configured to contain at least one battery cell, the non-porous interior wall being configured to conformally contact at least a portion of the at least one battery cell and configured to transport heat to or from the battery cell through conduction;
        a cavity disposed adjacent to the non-porous interior wall in a direction distal from the at least one battery cell;
        a non-porous exterior wall disposed adjacent to the cavity;
        a working fluid disposed within the cavity; and
        a heat transfer plate disposed in thermal contact on a first side with at least the working fluid, and on a second side with a cooling or heating environment;
    wherein the cavity further comprises:
        a porous wick; and
        a vapor space disposed adjacent to the porous wick;
    wherein the porous wick is an enclosed system configured to contain and cycle the working fluid between a liquid and a vapor phase, such that when the working fluid is in a liquid phase it saturates and travels through the porous wick allowing for the transfer of heat to or from the interior wall and the heat transfer plate, and such that when the working fluid is in a vapor phase it escapes the porous wick into the vapor space to transfer heat to or from the heat transfer plate;
    wherein the thermal management system and the at least one battery holding compartment, including at least the non-porous interior and exterior walls, the porous wick, and the heat transfer plate are all formed as a single continuous monolithic structure.

2. The thermal management system of claim 1, wherein the material of each the non-porous interior wall and exterior wall is separately selected from the group consisting of alloys, ceramics, and plastics.

3. The thermal management system of claim 1, wherein the thickness of each of the non-porous interior wall and non-porous exterior wall ranges separately from 0.1 mm to 20 mm.

4. The thermal management system of claim 1, wherein the surface roughness of the non-porous interior and non-porous exterior wall separately forms capillary channels of less than 500 μm.

5. The thermal management system of claim 1, wherein the working fluid is selected from the group consisting of water, acetone, ammonia, ethanol, methanol, heptane, toluene, perfluorocarbon fluids, and hydrofluorocarbon fluids such as R-134a.

6. The thermal management system of claim 1, wherein the porous wick is formed of a material selected from the group consisting of alloys, ceramics, and plastics.

7. The thermal management system of claim 1, wherein the surface roughness of the porous wick forms capillary channels of less than 500 μm.

8. The thermal management system of claim 1, wherein the porous wick has a variable porosity ranging from pore sizes on the order of 0.1 μm to pore sizes on the order of 100 μm.

9. The thermal management system of claim 1, wherein the porous wick comprises at least one of:
    an interior porous wick disposed adjacent to and in physical contact with the interior wall;
    an exterior porous wick disposed adjacent to the vapor space; and
    at least one bridge porous wick connecting the interior porous wick and exterior porous wick.

10. The thermal management system of claim 9, wherein the thickness of the interior porous wick and exterior porous wick ranges separately up to 2 cm.

11. The thermal management system of claim 9, wherein each of the at least one bridge porous wicks has a separate thickness ranging from 0.1 mm to 2 cm.

12. The thermal management system of claim 9, further comprising a plurality of bridge porous wicks, wherein the plurality of bridge porous wicks are arranged in a regular array between the interior porous wick and exterior porous wicks.

13. The thermal management system of claim 9, further comprising a plurality of bridge porous wicks, wherein the plurality of bridge porous wicks are distributed heterogeneously about a perimeter of the interior porous wick.

14. The thermal management system of claim 9, further comprising at least one flow channel have a channel diameter greater than 100 micron, the at least one flow channel being incorporated into the porous wick such that working fluid may be transported therethrough.

15. The cavity of claim 1, further comprising:
at least one flow channel;
wherein the at least one flow channel is an enclosed system configured to contain and cycle the working fluid, allowing for the transfer of heat to or from the interior wall and the heat transfer plate; and
wherein the thermal management system, including the at least one flow channel, is formed as a single continuous monolithic structure.

16. The thermal management system of claim 1, further comprising a plurality of battery holding compartments, wherein the plurality of battery holding compartments are formed as a single continuous monolithic structure.

17. The thermal management system of claim 16, wherein each of the adjacent battery holding compartments are fluidly interconnected such that working fluid may flow therebetween.

18. The thermal management system of claim 16, wherein each of the battery holding compartments in the plurality of battery holding compartments are separated by a thermal isolating structure disposed between at least a portion of the exterior walls of each two adjacent battery holding compartments.

19. The thermal management system of claim 18, wherein the thermal isolating structure defines a volume filled with a thermally isolating material selected from the group consisting of a phase change material, air, fiberglass, fiber, wool, or a vacuum.

20. An additive manufacturing process for creating a single continuous monolithic thermal management system, the process comprising:
the layer-by-layer deposition of at least one battery holding compartment comprising:
a non-porous interior wall defining the battery holding compartment configured to contain at least one battery cell, the non-porous interior wall being configured to conformally contact at least a portion of the at least one battery cell and configured to transport heat to or from the battery cell through conduction;
a cavity disposed adjacent to the non-porous interior wall in a direction distal from the at least one battery cell;
a non-porous exterior wall disposed adjacent to cavity;
a working fluid disposed within the cavity;
a heat transfer plate disposed in thermal contact on a first side with at least the working fluid, and on a second side with a cooling or heating environment;
wherein the cavity further comprises:
a porous wick; and
a vapor space disposed adjacent to the porous wick;
wherein the porous wick is an enclosed system configured to contain and cycle the working fluid between a liquid and a vapor phase, such that when the working fluid is in a liquid phase it saturates and travels through the porous wick allowing for the transfer of heat to or from the interior wall and the heat transfer plate, and such that when the working fluid is in a vapor phase it escapes the porous wick into the vapor space to transfer heat to or from the heat transfer plate;
wherein the thermal management system and the at least one battery holding compartment, including at least the non-porous interior and exterior walls, the porous wick, and the heat transfer plate are all formed as a single continuous monolithic structure.

* * * * *